(12) United States Patent
Barrios

(10) Patent No.: US 7,446,896 B2
(45) Date of Patent: Nov. 4, 2008

(54) METHOD AND APPARATUS FOR PRINTING INFORMATION ON A PAGE CONTAINING PREPRINTED OBJECTS

(75) Inventor: Sarah Jean Barrios, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 769 days.

(21) Appl. No.: 10/712,171

(22) Filed: Nov. 12, 2003

(65) Prior Publication Data

US 2005/0099656 A1    May 12, 2005

(51) Int. Cl.
*G06K 15/00* (2006.01)

(52) U.S. Cl. ............ 358/1.18; 358/1.12; 382/175; 382/209; 399/45

(58) Field of Classification Search ........... 358/1.15, 358/1.12, 538, 453, 474, 448, 462, 450, 1.1, 358/540; 382/164, 175, 209; 399/45, 389; 400/630; 347/14, 197; 283/17
See application file for complete search history.

(56) References Cited

U.S. PATENT DOCUMENTS

| | | | | |
|---|---|---|---|---|
| 5,452,094 A * | 9/1995 | Ebner et al. | ... | 358/450 |
| 5,592,305 A * | 1/1997 | Iwadate et al. | ... | 358/448 |
| 5,987,231 A * | 11/1999 | Fong et al. | ... | 358/1.1 |
| 6,023,528 A * | 2/2000 | Froessl | ... | 382/181 |
| 6,026,187 A * | 2/2000 | Siegel | ... | 358/450 |
| 6,373,591 B1 * | 4/2002 | Seaman et al. | ... | 358/1.18 |
| 6,594,405 B1 * | 7/2003 | Flannery | ... | 358/450 |
| 6,631,375 B2 * | 10/2003 | Jecha et al. | ... | 707/9 |
| 6,741,270 B1 * | 5/2004 | Rzepkowski et al. | ... | 715/810 |
| 6,846,056 B2 * | 1/2005 | Jacobsen et al. | ... | 283/17 |
| 7,056,048 B2 * | 6/2006 | Braun et al. | ... | 400/630 |
| 7,283,274 B2 * | 10/2007 | Sharma | ... | 358/1.1 |
| 2002/0122206 A1 * | 9/2002 | Currans et al. | ... | 358/1.18 |
| 2003/0009498 A1 * | 1/2003 | Koegler | ... | 707/517 |
| 2007/0076278 A1 * | 4/2007 | Nagarajan | ... | 358/538 |

* cited by examiner

*Primary Examiner*—Kimberly A Williams

(57) ABSTRACT

A method and apparatus is disclosed that can scan a page, detect the location and size of any devices or objects on the page, and then print information onto the page without printing the information onto the located devices.

21 Claims, 5 Drawing Sheets

METHOD AND APPARATUS FOR PRINTING INFORMATION ON A PAGE CONTAINING PREPRINTED OBJECTS

FIELD OF THE INVENTION

The field of this invention relates to digital devices.

BACKGROUND OF THE INVENTION

Many people have a desire to print letters and documents on their personal or business stationery or letterhead (see FIG. 5). Currently they have to measure or guess the location and size of the letterhead, motifs, monograms, and any other devices or objects located on their stationery. Then they try to format the letter or document they wish to print to avoid these devices. This is typically a trial and error process where the user adjusts the formatting and then does a trial print onto the stationery or letterhead. This is time consuming and can waste the expensive stationery.

Therefore there is a need for a device that can scan a page, detect the size and location of the devices on the page, and then print the letter or document correctly formatted for the scanned page.

SUMMARY OF THE INVENTION

A method and apparatus is disclosed that can scan a page, detect the location and size of any devices or objects on the page, and then print information onto the page without printing the information onto the located devices.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
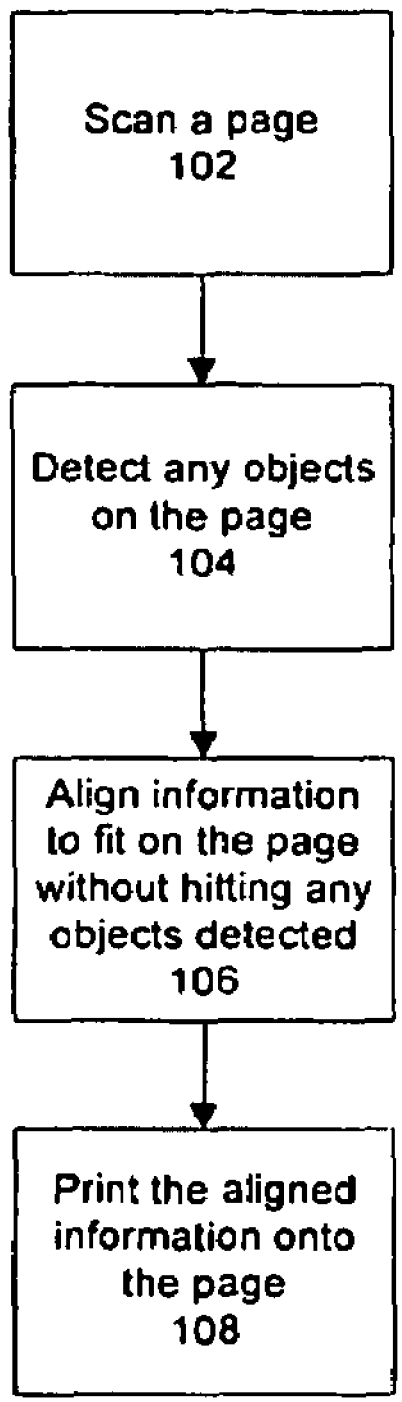
FIG. 1 is a flow chart for an example embodiment of the present invention.
Figure 2:
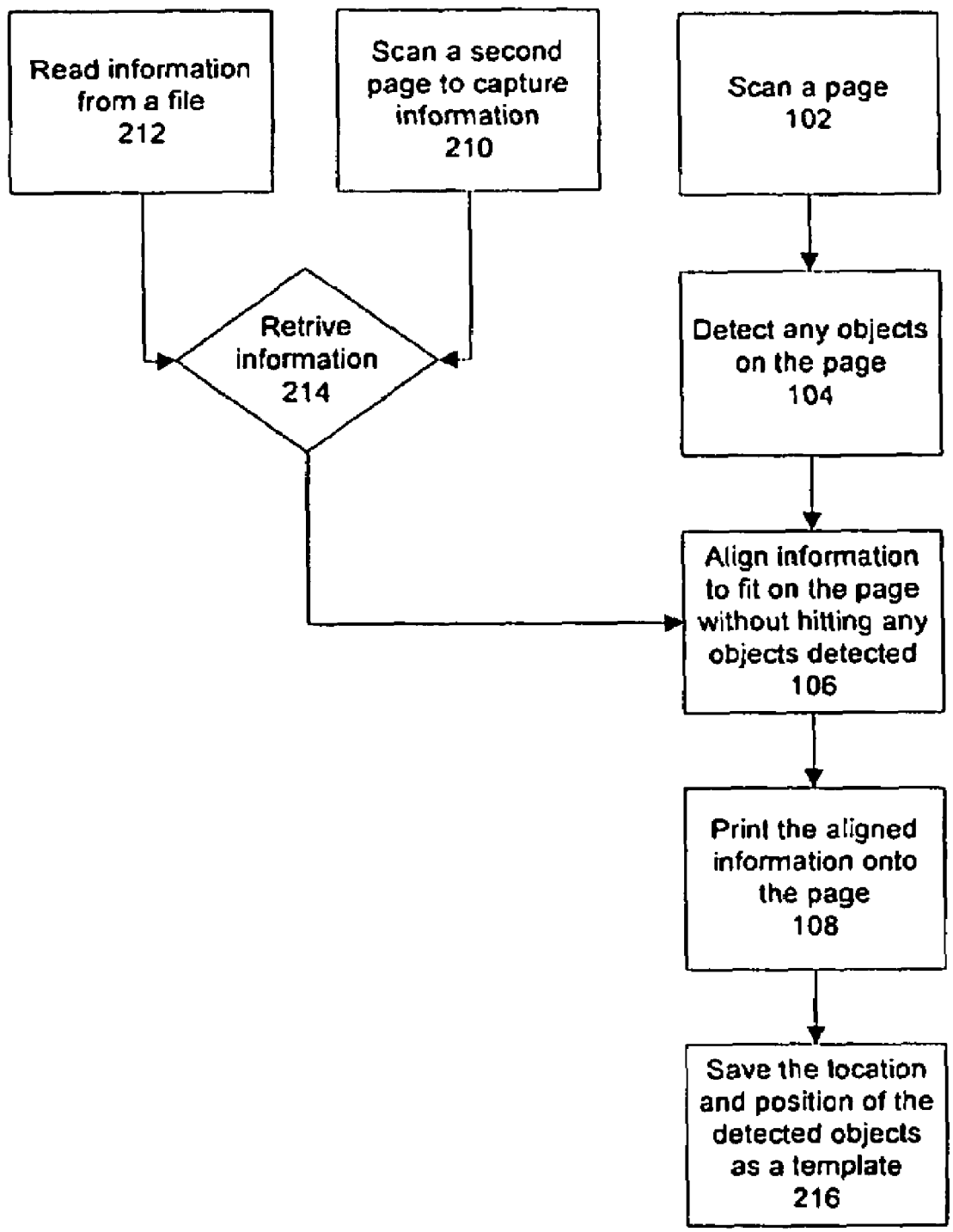
FIG. 2 is a flow chart for second example embodiment of the present invention.

In one example embodiment of the current invention, a page is scanned (102). The page may contain a letterhead, motifs, monograms, logos, a border, images, or other types of devices or objects. The location and size of these devices or objects are detected (104) using page decomposition software. Page decomposition software is well known in the arts, for example see U.S. Pat. No. 5,596,655 "Method for finding and classifying scanned information" by Patricia D. Lopez, which is hereby incorporated by reference. Once the size and location of the devices on the page have been determined, information is aligned to fit onto the page without overlapping any of the detected devices (106). The aligned information may be in a textual format. The aligned information may be graphical in nature. Or the aligned information may be a combination of text and graphics. Once the information has been aligned, the information is printed onto the page (108). The page may be the same page that was scanned, or it may be a page formatted similarly to the scanned page. Optionally, the size and location of the detected devices or objects are saved to a file to create a template (216). The template can be used to align and print additional information to copies of the scanned page without having to re-scan the page each time.

In one example embodiment of the current invention, the information to be printed is retrieved from a file (212). In another example embodiment of the current invention, the information to be printed onto the page is scanned from a different page (210). If the information scanned from the different page is textual in nature, then in the preferred embodiment, the information will be converted from the scanned bitmap into text using optical character recognition (OCR) software. Once converted into text, the text will be aligned to fit onto the page. In another example embodiment of the current invention, the information to be printed is sent from a program (not shown), typically a word processing program.

Figure 3:
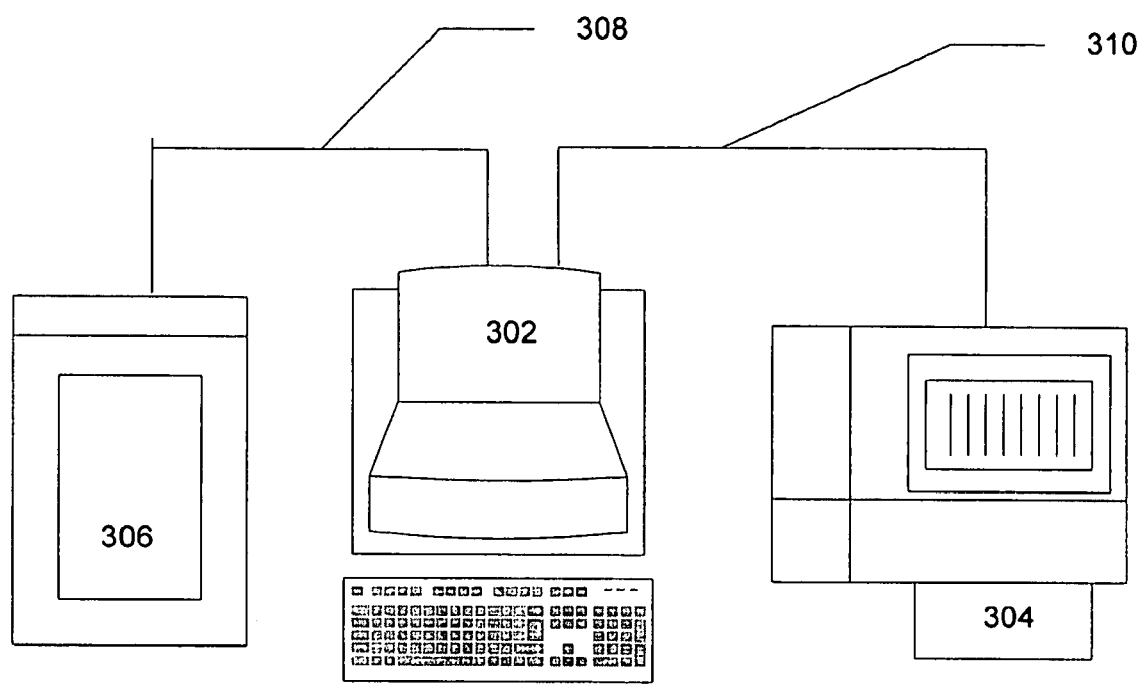
FIG. 3 is a block diagram of a computer system that could implement an example embodiment of the present invention.

FIG. 3 shows a computer system (302) with a printer (304) and a scanner (306) attached to the computer system. The scanner (306) is connected to the computer (302) with an I/O bus (308). The printer (304) is connected to the computer (302) with an I/O bus (310). I/O bus 308 and 310 may be a USB bus, a SCSI bus, a fire-wire bus, a parallel interface, or the like. In one example embodiment of the current invention, a page containing objects or devices is scanned using the scanner (306). Software running on the computer (302) may be used to control the scanner (306). Devices or objects located on the scanned page are detected. The devices or objects may be detected by the scanner (306) or they may be detected with software running on the computer (302). Once the location and size of the devices or objects have been determined, information is formatted such that the information will not encroach onto the located devices or objects when printed onto the page. The adjustment of the information may occur in the computer (302) or it may occur in the printer (304). Once the information has been aligned, the information is printed onto the page. In one example embodiment of the current invention, the user is prompted to move the scanned page from the scanner (306) to the printer (304) so that the information can be printed onto the same page that was scanned. In another example embodiment of the current invention, a second page with the same devices or objects, is used to receive the aligned information. Optionally, the size and location of the detected devices or objects may be saved on the computer (302) as a template.

In one example embodiment of the current invention, the information is retrieved from a file located on the computer (302). In another example embodiment of the current invention, the information is located in a program running on the computer (302), typically a word processing program. In another example embodiment of the current invention, a second page is scanned to capture the information contained on the page. The computer (302) may be connected to a network or the Internet with a communication link (not shown). The communication link may be a modem, a broadband connection, or the like. In another example embodiment, the information to be aligned may be downloaded from the Internet using the communication link.

Figure 4:
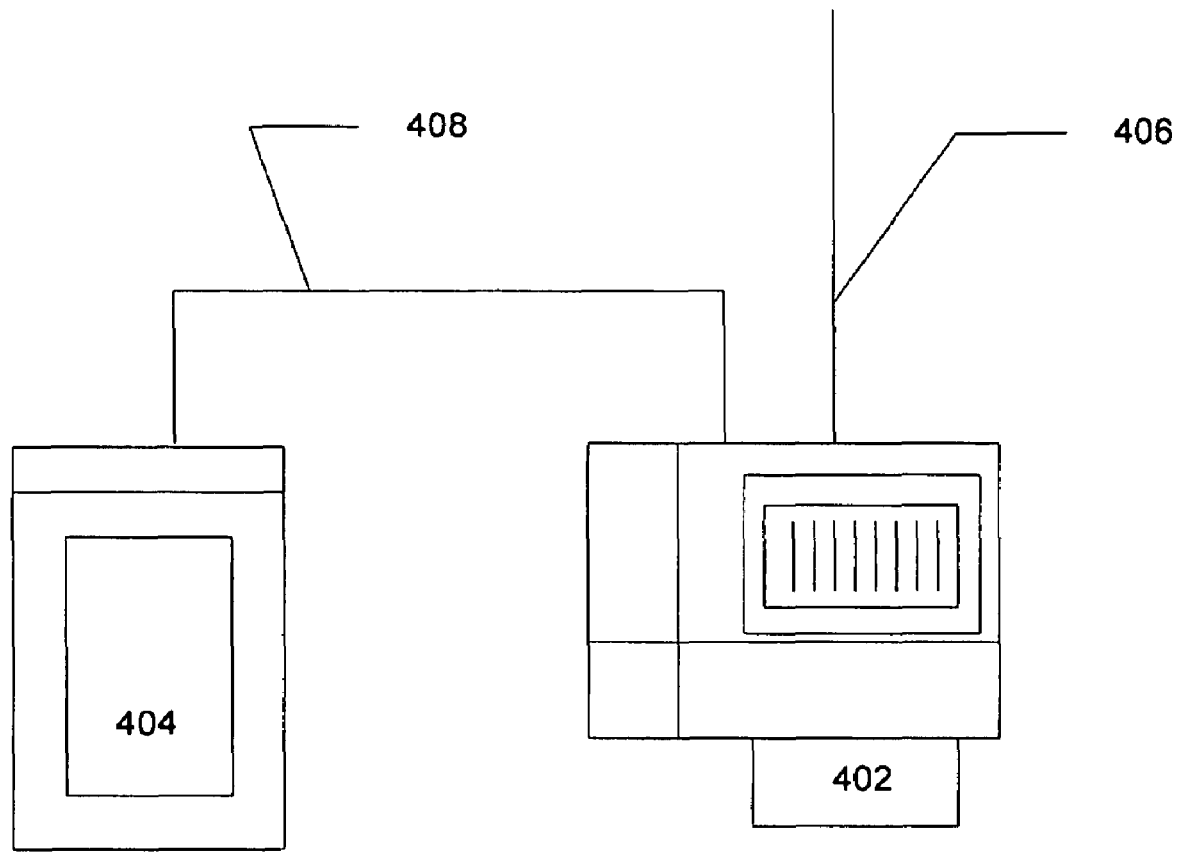
FIG. 4 is a block diagram of a scanner printer combination that could implement an example embodiment of the present invention.
Figure 5:
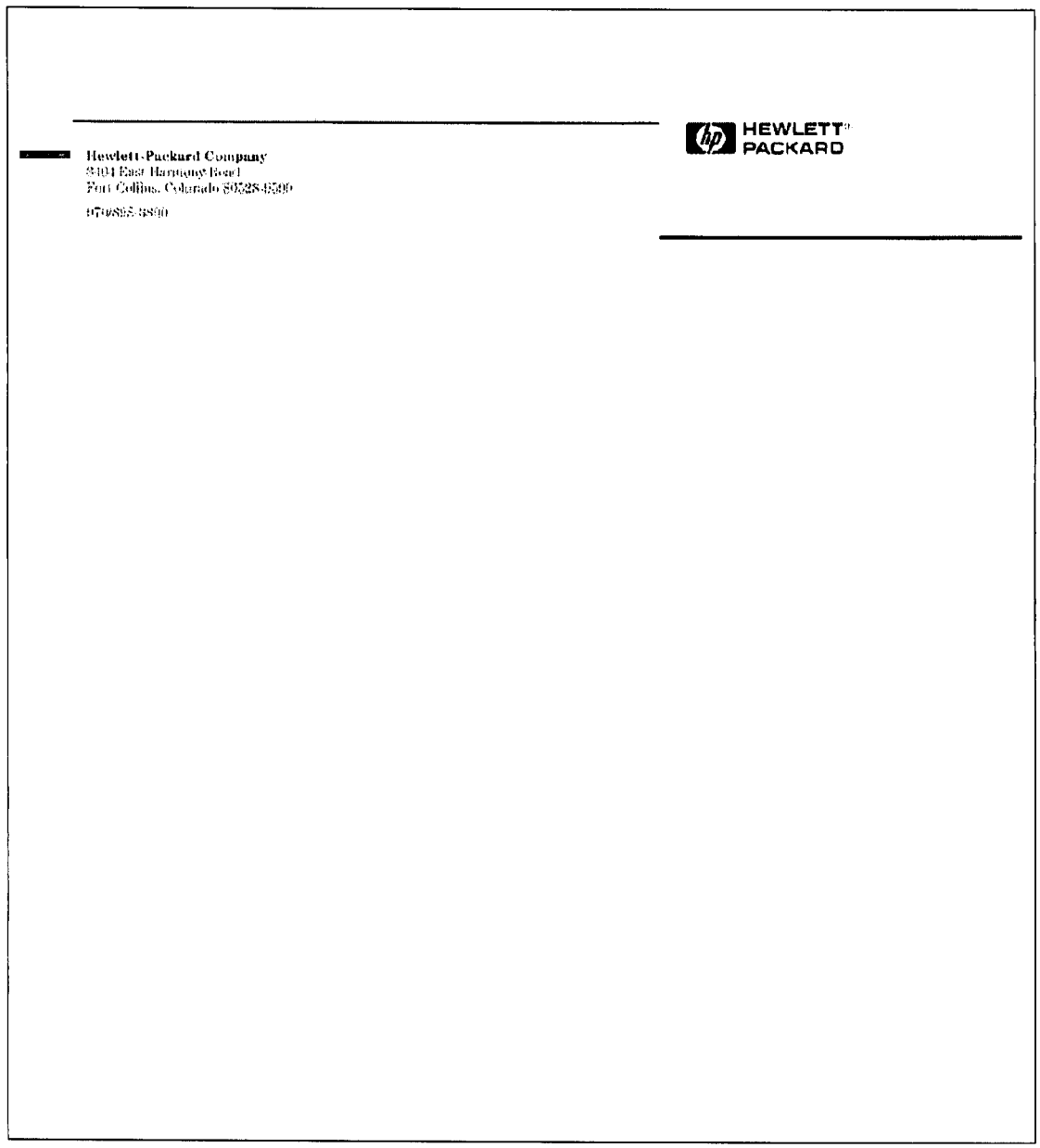
FIG. 5 is a sample page of stationery.

FIG. 4 shows a printer (402) connected to a scanner (404) with an I/O bus (408). The printer (402) is also connected to a network, for example the Internet, (not shown) with an I/O bus (406). The connection to the network could also be attached to the scanner (404). I/O bus 406 and 408 may be a USB bus, a SCSI bus, a fire-wire bus, a parallel interface, or the like. In one example embodiment of the current invention, a page is scanned using the scanner (404). Devices or objects located on the scanned page are detected. Once the location and size of the devices or objects have been determined, information is formatted such that the information will not overlap onto the located devices or objects when printed onto the page. The adjustment of the information may occur in the scanner (404) or it may occur in the printer (402). Once the information has been aligned, the information is printed onto the page. In one example embodiment of the current invention, the user is prompted to move the scanned page from the scanner (404) to the printer (402) so that the information can be printed onto the same page that was scanned. In another example embodiment of the current invention, the aligned information is printed onto a second page with the same formatting as the scanned page. Optionally, the size and location of the detected devices or objects may be saved on the network (302) as a template. In another example embodiment of the current invention, the scanner and printer may be combined into one device, for example an all-in-one device (not shown).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   scanning a page;
   using page decomposition software to locate at least one device on the page;
   scanning a different page for acquiring content on the different page; and
   automatically printing the content onto the page without printing information on the at least one device and without a user using a program to manually position the content to avoid the devices on the page.

2. The method of claim 1 further comprising:
   storing a template of the scanned page where the template contains the location and size of the at least one device.

3. A method comprising:
   scanning a first page with a scanner;
   using the scanner to locate a position and size of at least one object on the first page;
   scanning a different page;
   using optical character recognition software to convert a portion of information on the different page into text;
   aligning the information and the text to fit onto the first page without the information encroaching onto the at least one object on the first page; and
   automatically printing the information and the text onto the page without printing the information and the text on the at least one object and without a user using a program to manually position the information and the text to avoid the at least one object on the first page.

4. The method of claim 3 where the information aligned is text.

5. The method of claim 3 where the information aligned is graphical.

6. The method of claim 3 further comprising:
   printing the aligned information onto the first page.

7. The method of claim 3 further comprising:
   printing the aligned information onto a second page, where the second page is essentially a copy of the first page.

8. The method of claim 3 further comprising:
   scanning a second page to capture the information to be aligned.

9. The method of claim 3 further comprising:
   receiving the information to be aligned as digital information.

10. A method comprising:
    scanning a page of stationery;
    using the printer to locate at least one device preprinted on the stationery;
    reading a file containing content, including strings of text; and
    automatically formatting the text such that the text is positioned correctly for the page of stationery, with respect to the location of the at least one device and without a user using a program to manually position the text to avoid the at least one device on the preprinted stationary.

11. The method of claim 10 where the device is a letterhead.

12. The method of claim 10 where the device is a logo.

13. The method of claim 10 further comprising:
    printing the formatted string of text onto the stationery.

14. The method of claim 10 where the string of text is created in a word processing program.

15. The method of claim 10 where the content includes graphical images.

16. A system, comprising:
    a scanning device configured to generate a first digital representation of a first page and a second digital representation of a second page placed onto the scanning device; and
    a processor configured to detect the location of at least one object in the first digital representation of the first page and for acquiring information on the second page;
    a printing device;
    the processor configured to automatically print the information from the second page on the first page in a location that does not overlap with the location of the at least one detected object in the first digital representation of the first page and without a user using a program to manually position the information to avoid the at least one object on the first page.

17. The system of claim 16 where the system is connected to the Internet with a communication link.

18. The system of claim 16 where the scanning device is integrated into the printing device.

19. A system, comprising:
    a scanner configured to generate a first digital representation of a first page and a second digital representation of a second page placed onto the scanning device;
    a computer connected to the scanner, the computer configured to detect the location of at least one object in the first digital representation of the first page and for acquiring information on the second page;
    optical character recognition software configured to convert a portion of information on the second page into text; and
    a printer connected to the computer;
    the computer configured to automatically print the information from the second page on the first page in a location that does not overlap with the location of the at least one detected object in the digital representation of the first page and without a user using a program to manually position the information to avoid the at least one object on the first page.

20. The system of claim 19 where the system is connected to the Internet with a communication link.

21. A device, comprising:

a means for scanning a page;

a means for scanning a different page for acquiring information on the different page;

a means for reading a file containing content; and a scanner and printer combination all-in-one device means for detecting the size and location of objects printed on the page;

a means for acquiring the content and the information and aligning the content and the information to fit on the page while avoiding the detected objects; and a means for printing the aligned content and information onto the page automatically without printing the content and the information on the objects and without a user using a program to manually position the content and the information to avoid the objects on the page.

* * * * *